June 24, 1952 H. W. PRICE 2,601,629
TRANSMISSION OPERATING MECHANISM
Filed Feb. 10, 1945 8 Sheets-Sheet 4
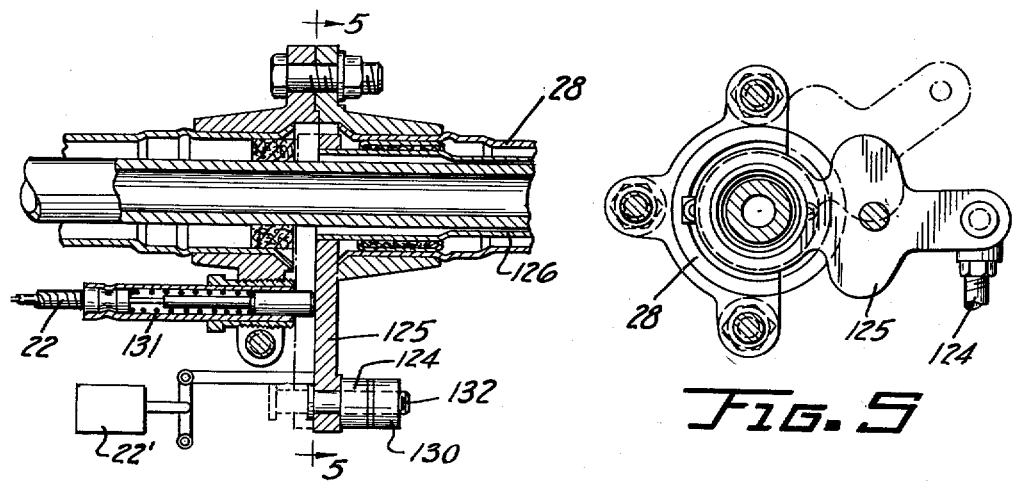
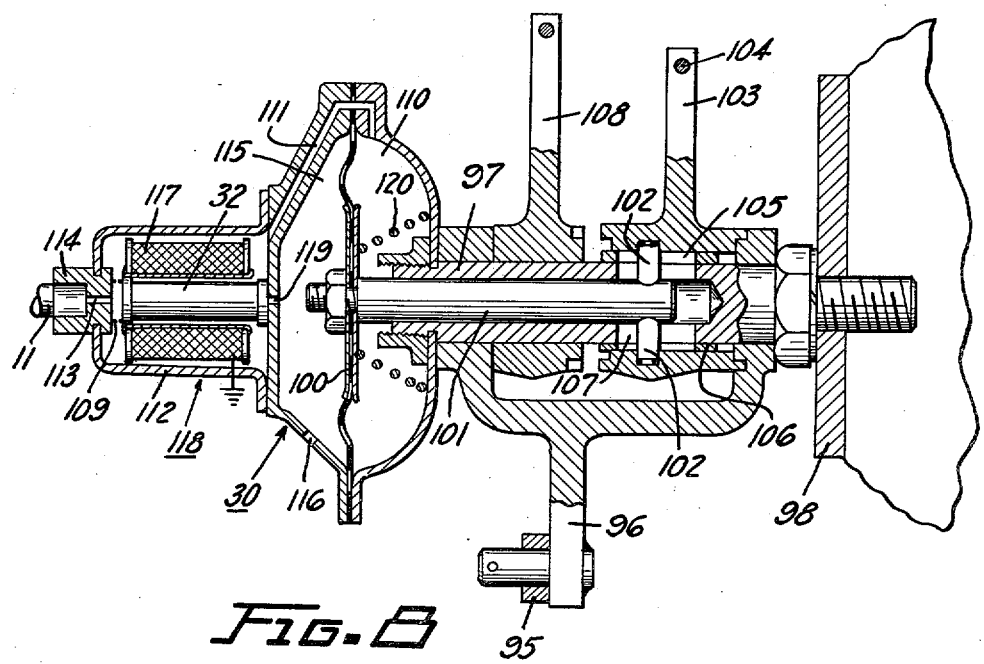
INVENTOR
HAROLD W. PRICE
BY H. O. Clayton
ATTORNEY June 24, 1952 H. W. PRICE 2,601,629
TRANSMISSION OPERATING MECHANISM
Filed Feb. 10, 1945 8 Sheets-Sheet 5

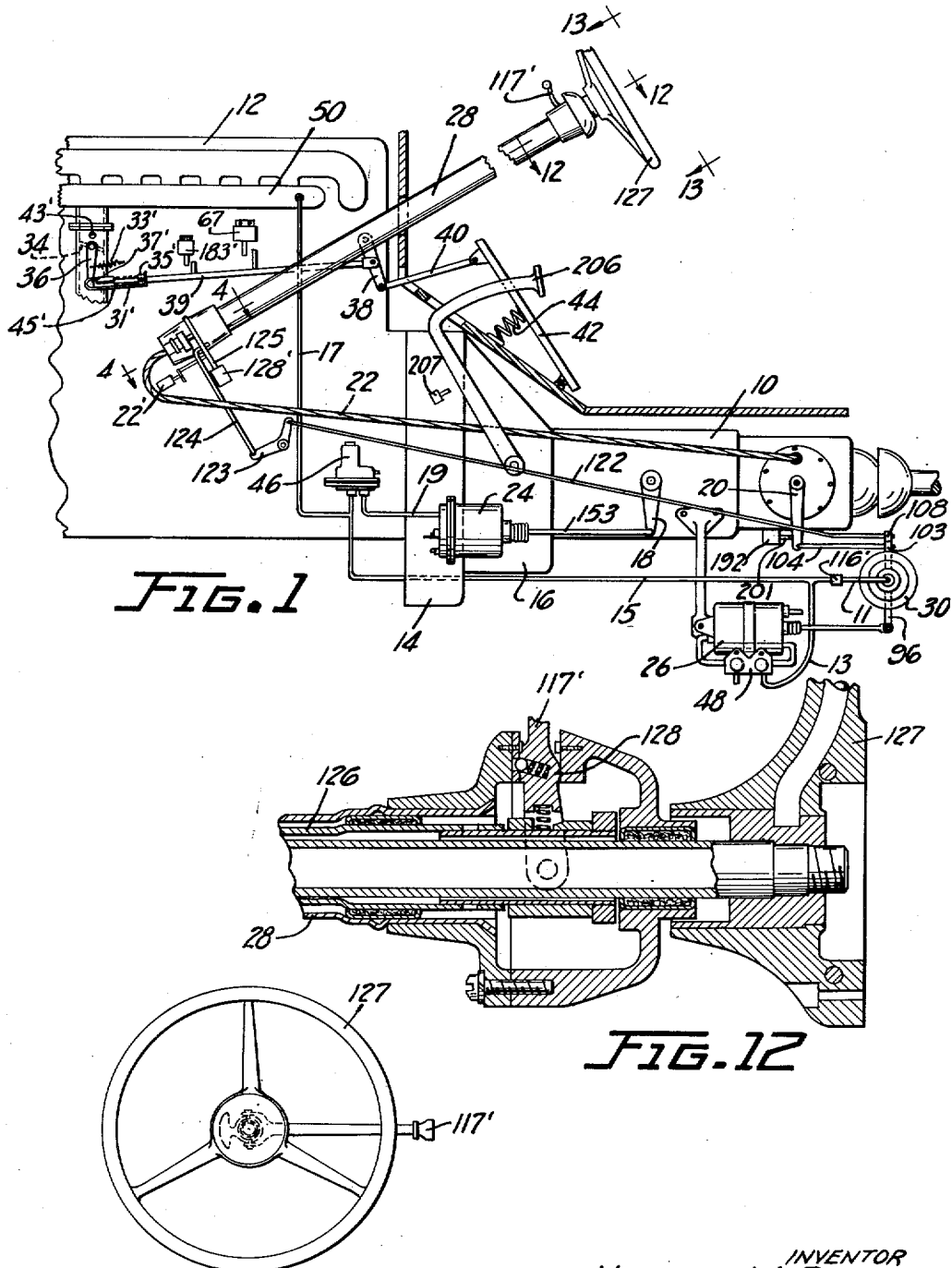

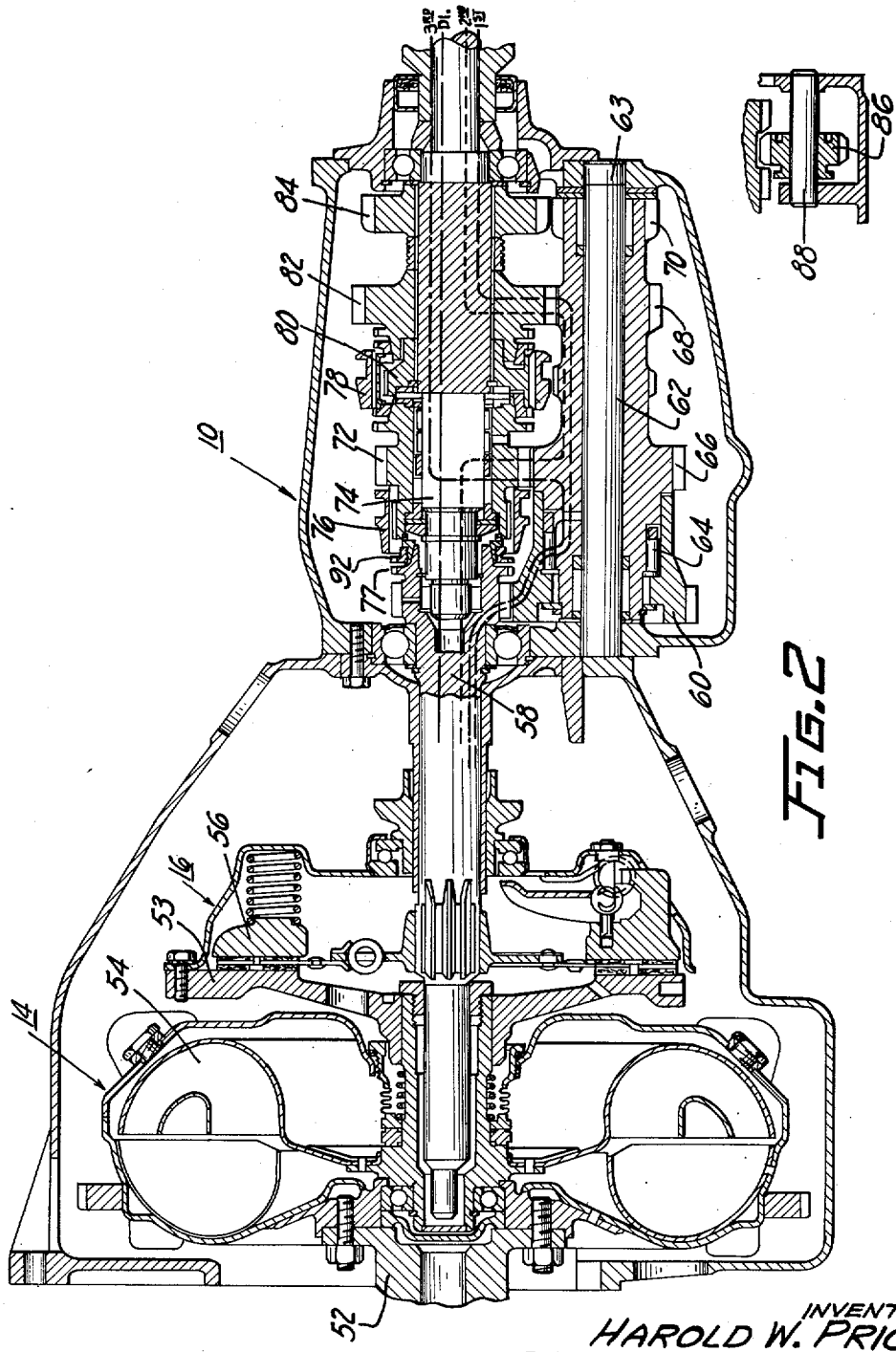

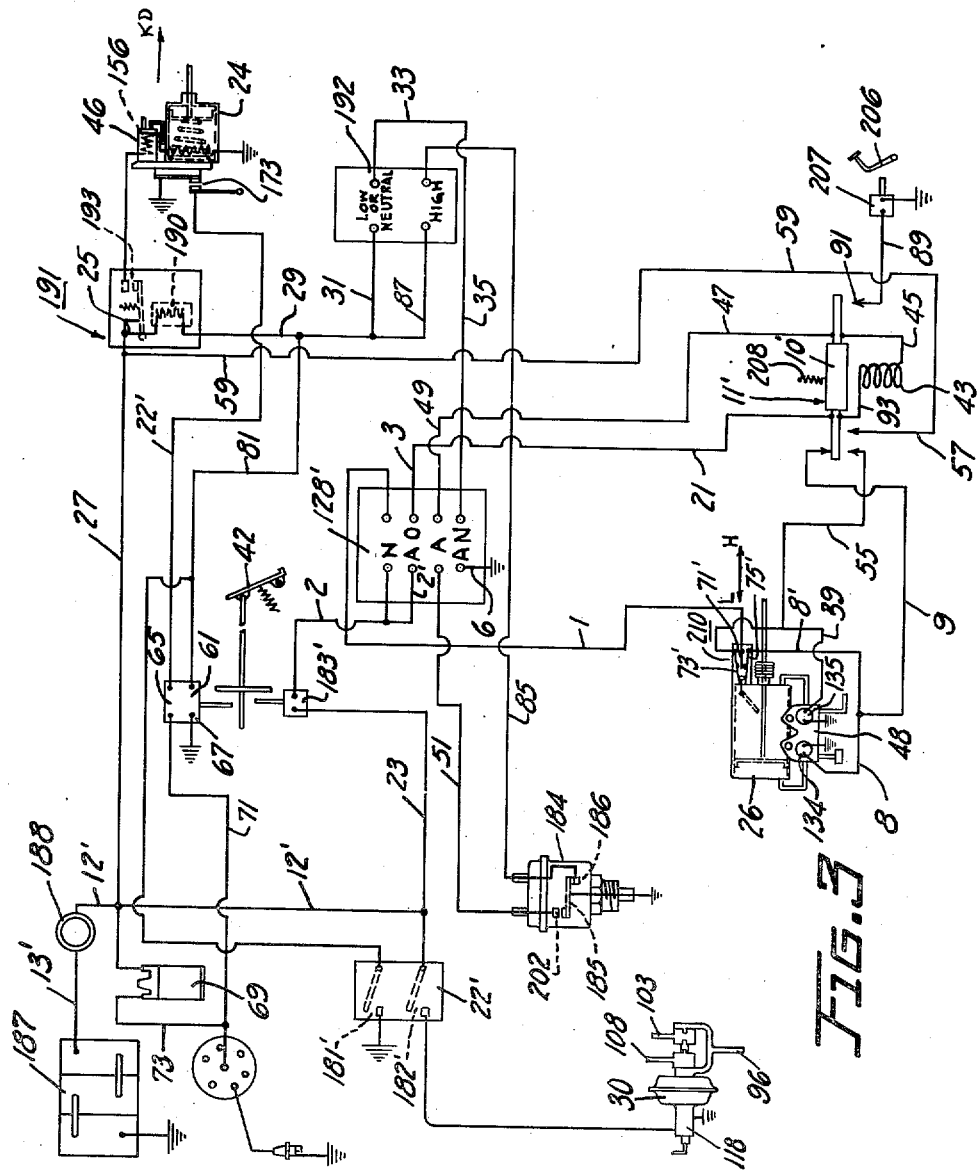

INVENTOR
HAROLD W. PRICE
BY H. O. Clayton
ATTORNEY

INVENTOR
HAROLD W. PRICE
BY
H. O. Clayton
ATTORNEY

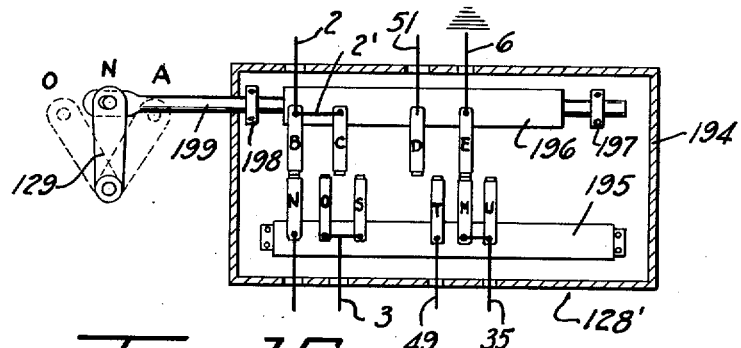
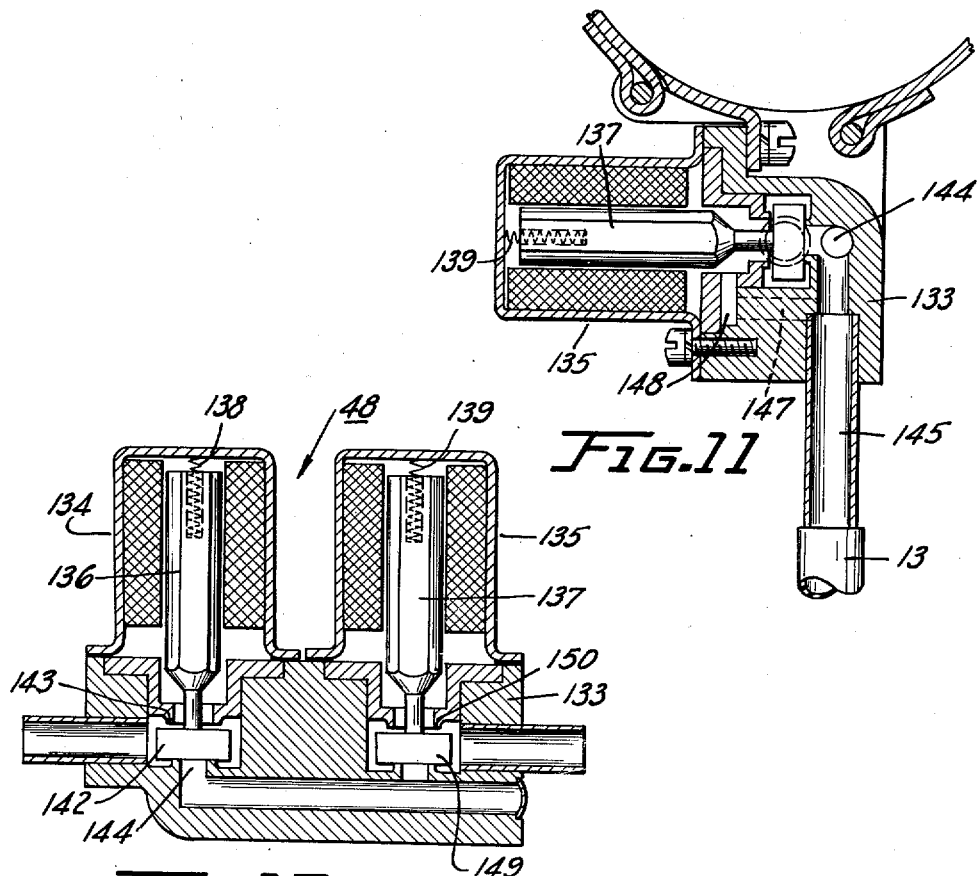

June 24, 1952 H. W. PRICE 2,601,629
TRANSMISSION OPERATING MECHANISM
Filed Feb. 10, 1945 8 Sheets-Sheet 8
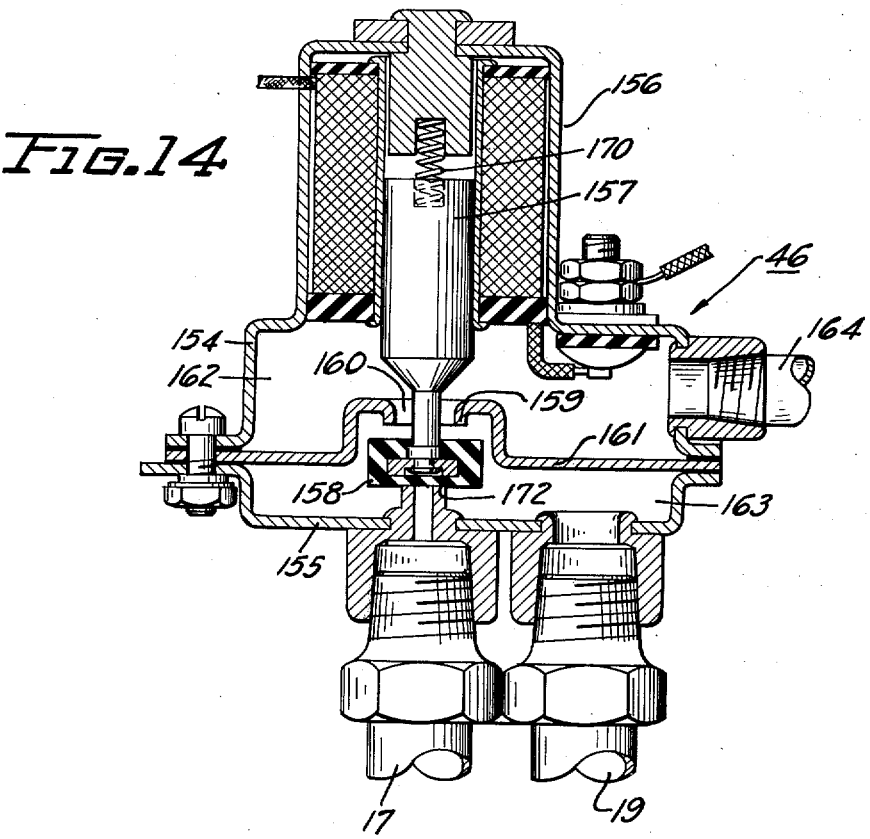
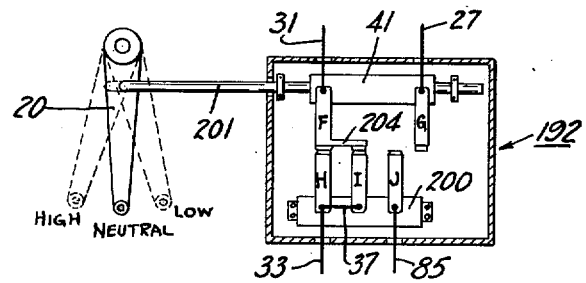
INVENTOR
HAROLD W. PRICE
BY
H. O. Clayton
ATTORNEY Patented June 24, 1952

2,601,629

UNITED STATES PATENT OFFICE 2,601,629

TRANSMISSION OPERATING MECHANISM

Harold W. Price, Bradenton, Fla., assignor to Bendix Aviation Corporation, South Bend, Ind., a corporation of Delaware Application February 10, 1945, Serial No. 577,201

1 Claim. (Cl. 74—335)

This invention relates in general to power transmissions and in particular to power and manually operated means for operating a change speed transmission of an automotive vehicle.

An object of my invention is to provide, in the power plant of an automotive vehicle which includes a fluid coupling, a friction clutch, and a kickdown transmission, means for operating and controlling the operation of the transmission said means being so constructed as to provide flexibility of car control with very little effort on the part of the driver.

One of the principal objects of my invention is to provide a combined power and manually operated means for operating a four-speeds forward and reverse change-speed transmission said means serving, when the vehicle is at a standstill, the engine is running and a selector lever is placed in a certain position, to establish the transmission in its first gear setting and then, after the car is under way and reaches a certain speed, serving to automatically shift said transmission from its first gear setting to its third gear setting the latter operation being followed, after a relatively short space of time, by another automatic operation of the transmission operating means to establish the transmission in its fourth gear setting. As to the downshift cycle of operations of my transmission operating mechanism at a predetermined vehicle speed or when the accelerator is fully depressed, said mechanism will automatically shift the transmission from its fourth gear setting to its third gear setting and if a manually operated switch such as a clutch pedal operated switch is then closed, the transmission will then be established in its first gear setting.

It is a further object of my invention to provide means for operating a four-speeds forward and reverse transmission said means being automatically operable, after a manually operated selector lever is placed in one of four positions and the accelerator of the vehicle is released, to successively effect certain operations of the transmission, said means serving to establish the transmission in its neutral setting when the selector lever is placed in a second of the aforementioned four positions, serving to establish the transmission in its reverse gear setting when the selector lever is placed in a third of the aforementioned four positions and serving to establish the transmission in one or the other of two settings when the selector lever is placed in the fourth of the aforementioned four positions. A further object of my invention is to provide means, cooperating with the aforementioned transmission operating means and constituting a part thereof, for so controlling the operation of the ignition system of the vehicle as to facilitate a certain operation of the transmission operating means.

A further object of my invention is to provide means for so operating a four speeds forward and reverse transmission as to successively effect, in the upshift cycle of operations of the transmission from a first gear setting, a third and then a fourth gear setting of the transmission said means including means for insuring the third gear setting of the transmission before the fourth gear setting may be effected. It is a further object of my invention to so construct this transmission operating means as to successively effect third and first gear settings of the transmission in the downshift cycle of operations of the transmission said means including means for insuring the third gear setting of the transmission before the first gear setting may be effected.

A further object of my invention is to provide a power plant for an automotive vehicle including an internal combustion engine, an accelerator, an ignition system, a propeller shaft drivably connected to the rear wheels of the vehicle, a four-speeds forward and reverse transmission including free wheeling means operable to provide a unidirectional drive between the engine and propeller shaft when the transmission is established either in its third gear setting or its first gear setting, and power and manually operated means for operating said transmission, certain operations of said transmission operating means being facilitated by operations of the accelerator, the fluid coupling, the ignition system and the free wheeling means of the transmission.

Yet another object of my invention is to provide means for operating a four-speeds forward and reverse transmission of an automotive vehicle to successively establish the transmission in its first, third and fourth gear settings during the upshift cycle of operations and to then successively establish the transmission in its third and first gear settings in the downshift cycle of operations. A further object of my invention is to facilitate these operations of the transmission operating means by including in the power plant of the vehicle a friction clutch constituting a part of the means interconnecting the transmission and engine and by so constructing said transmission that the same becomes a unidirectional driving means between the engine and propeller shaft when the transmission is established in either its first gear setting or its third gear setting.

Yet another object of my invention is to provide a power plant for an automotive vehicle including an internal combustion engine, an ignition system for in part controlling the operation of said engine, an accelerator, a friction clutch, means for operating said clutch, a four-speeds forward and reverse transmission including free wheeling means operable to facilitate a demeshing operation of the transmission when the same is established in its first and third gear settings, and means, whose operation is facilitated by an operation of the accelerator and friction clutch, for operating said transmission.

Yet another object of my invention is to provide means for operating a four-speeds forward and reverse transmission which includes free wheeling means operative to make of the transmission a unidirectional driving means when and only when the transmission is established in either one of two of its forward gear settings, the operation of said transmission operating means being facilitated by the torque controlling operations of the aforementioned free wheeling means of the transmission, the accelerator of the vehicle in its control of the engine of the vehicle, the ignition system which is momentarily disabled by the transmission operating means to facilitate a certain operation of said means and a fluid coupling interposed in the power plant between the engine and transmission said fluid coupling facilitating the establishment of the transmission in its first gear setting from its neutral setting when and only when the engine is operating at a relatively low R. P. M. and the car is at a standstill.

My invention further contemplates the provision of means for operating the four-speeds forward and reverse transmission of an automotive vehicle said transmission operating means including two motors each having a high and a low setting, one of said motors, when established in its high setting, cooperating with the other motor to effect the third and fourth gear settings of the transmission and when established in its low setting cooperating with said other motor to effect the first and second gear settings of the transmission said transmission operating means further including electro-pneumatic means for controlling the operation of said motors.

Yet another object of my invention is to provide manual and power operated means for operating a four-speeds forward and reverse transmission which includes a selector member and two gear shifter members said transmission operating means including a selector lever, preferably mounted beneath the steering wheel of the vehicle, movable in three different planes to four different positions the movement to one of said positions, which may be called an overrule position, effecting, by the operation of power means, a certain setting of the transmission; the movement to another position effecting, by the operation of power means, a neutral setting of the transmission; the movement to an automatic position making possible the establishment of the transmission in three of its settings; and the movement to a fourth position effecting, by power means and by the physical effort of the driver, the reverse gear setting of the transmission.

Other objects of my invention and desirable details of construction will become apparent from the detailed description of certain embodiments of the invention described in the specification to follow and disclosed in the accompanying drawings, in which:

Figure 1 is a diagrammatic view of a portion of the power plant of an automotive vehicle including the particular transmission and the transmission operating mechanism constituting my invention;

Figure 2 is a longitudinal sectional view through a portion of the power plant disclosed in Figure 1 said view disclosing details of the fluid coupling, friction clutch and three-speeds forward and reverse transmission of said plant;

Figure 3 is a schematic view of the principal elements of the transmission operating electro-pneumatic mechanism constituting my invention;

Figure 4 is a sectional view, taken along the line 4—4 of Figure 1, showing a portion of the manually operated control means of the shifter mechanism;

Figure 5 is a detail sectional view taken on the line 5—5 of Figure 4;

Figure 8 is a sectional view disclosing details of the pressure differential and spring operated motor and cooperating parts of the linkage for effecting a manual reverse gear operation of the shifter mechanism;

Figure 6:
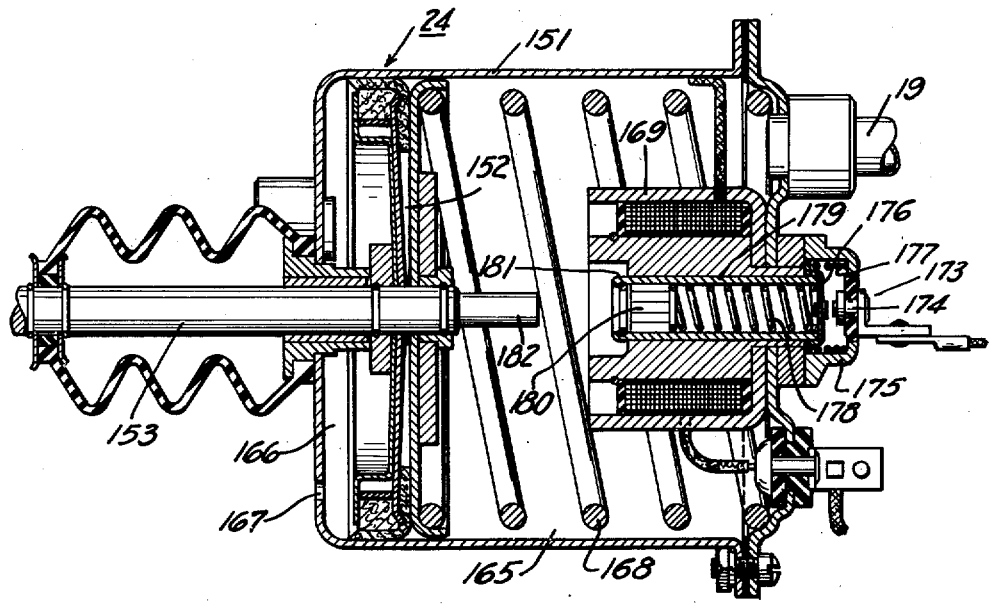
Figure 6 is a sectional view showing details of the so-called kickdown spring and vacuum operated motor of my invention.
Figure 17:
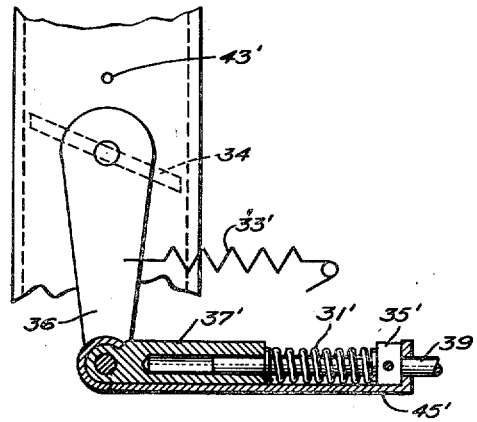
Figure 9:
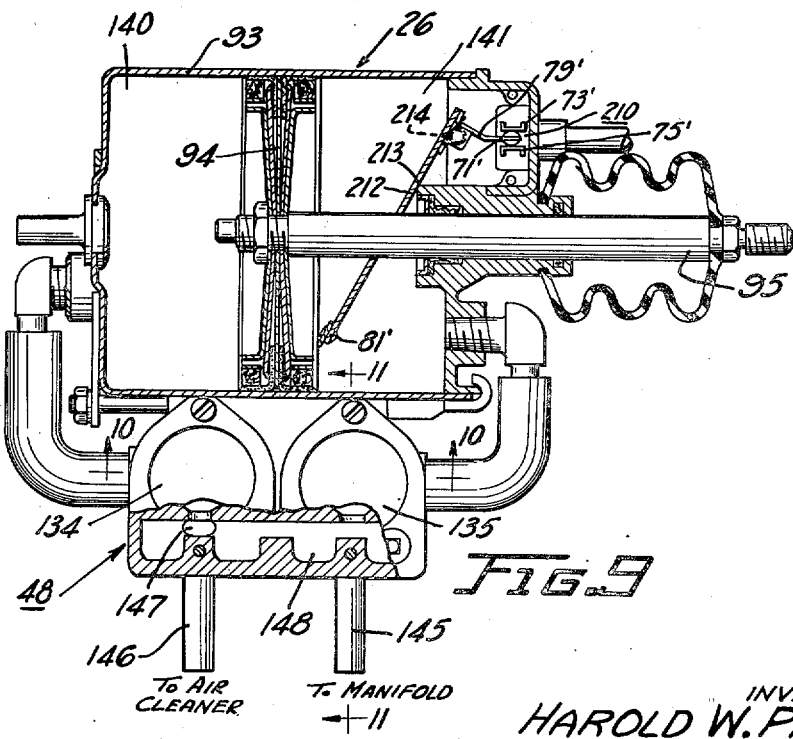
Figure 9 is a view, largely in section, disclosing details of the double acting pressure differential operated motor for actuating the range selecting synchronizer 80 of the transmission disclosed in Figure 2.

Figures 10 and 11 are sectional views, taken on the lines 10—10 and 11—11 of Figure 9 respectively, disclosing details of the control valve of the motor unit of Figure 9;

Figure 12 is a sectional view, taken on the line 12—12 of Figure 1, of a portion of the manually operated remote control mechanism of my invention;

Figure 13 is a plan view, taken on the line 13—13 of Figure 1, disclosing the steering wheel of the vehicle and the shift lever associated therewith;

Figure 14 is a sectional view of the control valve for the kickdown motor disclosed in Figure 6;

Figure 15 is a schematic view disclosing details of the transmission operated so-called interlock switch of my invention;

Figure 16 is a view, similar to Figure 15, disclosing details of the manually operated selector switch operated by the shift lever of Figure 13; and Figure 17 is a view disclosing the yieldable connection in the linkage interconnecting the accelerator and throttle.

There is diagrammatically disclosed in Figure 1 a preferred embodiment of the transmission operating and controlling mechanism constituting my invention. In this embodiment a four speeds forward and reverse transmission 10 is incorporated in the power plant of the automotive vehicle and between said transmission and the internal combustion engine 12 of the vehicle there are included a fluid coupling 14, and a friction clutch 16 of conventional design. The elements 10, 14 and 16 of the power plant are disclosed in detail in Figure 2; however they do not of themselves constitute a part of my invention. In other words no claim is made to the details of the friction clutch, fluid coupling and change speed transmission. My invention lies in the combination of elements diagrammatically disclosed in Figures 1 and 3 and detailed in other figures of the drawing; particularly in the power and manually operated means for operating the aforementioned transmission said operation being facilitated by the operation of the accelerator, the friction clutch, the ignition system and the fluid coupling of the power plant.

The transmission operating power and manually operated mechanism constituting my invention is in large measure automatic in action by virtue of the operation of the power means of said mechanism however as will be brought out hereinafter the reverse gear setting of the transmission is effected by the manual operation of certain control members.

Referring now again to Figure 1 of the drawings the particular change-speed transmission of my invention may be actuated by two cranks 18 and 20 and a Bowden control 22, said cranks being actuated by pressure differential operated motors 24 and 26 respectively and the Bowden control being actuated by the hereinafter described force transmitting means mounted within and upon the steering column 28 of the vehicle. A spring and pressure differential operated motor 30, Figure 8, also serves as a part of the power means for operating the transmission mechanism of my invention, said motor being controlled by a valve 32. The carburetor throttle valve 34 disclosed in Figure 1 is actuated by force transmitting means including cranks 36 and 38, links 39 and 40, the hereinafter described lost motion connection interconnecting the crank 36 and rod 39, and the accelerator 42 of the vehicle the latter being moved to its throttle closed position by a return spring 44. The motors 24 and 26 are controlled by valve means 46 and 48 respectively said valves, together with the aforementioned valve 32, being connected to the intake manifold 50 of the engine 12 by the interconnected conduits disclosed in Figure 1. These conduits, indicated by the reference numerals 11, 13, 15, 17 and 19, will be referred to in the description to follow.

Describing now that part of the power plant disclosed in detail in Figure 2 the fluid coupling 14 is bolted directly to the crank shaft 52 of the engine and the driving member 53 of the friction clutch 16 is connected to the driven member 54 of the fluid coupling. The driven member 56 of said clutch is connected to the drive pinion 58 of the four-speeds forward and reverse transmission 10 said transmission constituting one of the principal elements of my invention. The drive pinion 58 meshes with the free wheeling gear 60 on the countershaft 62 which is mounted on a support 63; and this gear 60 in turn drives, through the free wheeling unit 64, the cluster gear said cluster gear comprising the countershaft third speed gear 66, the countershaft first speed gear 68 and the countershaft reverse gear 70. Meshing with gear 66 is the main shaft third speed gear 72 which is mounted on the mainshaft 74 on roller bearings and which may be directly clutched to the drive pinion 58 by means of a synchro-clutch sleeve 76 of a synchro-clutch 77. When these parts are so clutched and the mainshaft third speed gear 72 is coupled with a power operated sleeve 78 of a synchronizer 80 then the transmission is established in its fourth gear or direct drive setting said setting being indicated by the relatively long dash lines in Figure 2.

The gear 72 is thus directly coupled to the mainshaft 74 to effect a high range setting of the transmission by sliding the power operated sleeve 78 of the synchronizer 80 forward into engagement with the clutching teeth of said gear. When this high range setting is established the transmission may, by a kickdown operation, be established in its third gear setting by declutching the synchro-clutch sleeve 76 from the drive pinion 58. This third gear setting of the parts is indicated by the dot and dash line in Figure 2. The hub of the synchronizer 80 is splined to the mainshaft 74 and this synchronizer serves also to couple a mainshaft low speed gear 82 to the mainshaft when the sliding sleeve 78 is moved to the right, Figure 2, so as to engage the clutching teeth on said gear 82; and when the parts are in this position the transmission is set to be established in its low range setting. This low range setting having been established the transmission may be established in its second gear setting by moving the sleeve 76 into engagement with the pinion 58 and may be established in its first gear setting by moving said sleeve out of engagement with said pinion. These first and second gear settings are indicated respectively by the relative short dash lines and the closely spaced dots in Figure 2.

The transmission is of course established in its neutral setting, to disengage the engine from the propeller shaft of the vehicle, when the sleeve 78 is moved out of engagement with gears 72 and 82; and said sleeve is shown in this position in Figure 2. A mainshaft reverse gear 84 is splined to the mainshaft 74 and a reverse idler gear 86 is mounted on an individual shaft 88. This idler gear may, by a manual operation of the aforementioned Bowden control 22 to swing a lever 89 into mesh with the slotted end of a fork 90 and a subsequent bodily movement of said fork, be moved into mesh with the countershaft reverse gear 70 and said mainshaft reverse gear 84. This manual operation of establishing the transmission in its reverse gear setting will be described in greater detail hereinafter.

Describing in greater detail the operation of the synchro-clutch 77 the synchro-clutch sleeve 76 serves to couple the driving pinion 58 with mainshaft third speed gear 72 when the hereinafter described automatic upshift is made from third to fourth gear. As disclosed in Figure 2 sleeve 76 is splined to the mainshaft third speed gear 72 and a synchro-clutch blocker ring 92 is mounted between the gear 72 and pinion 58 in such a manner as to prevent the forward movement of said sleeve into engagement with clutching teeth on the rear end of said pinion until the two parts have come to the same speed of rotation. In order to accomplish this blocking action and prevent the engagement of the sleeve with the drive pinion clutching teeth the blocker ring 92 rotates a sufficient amount, with respect to third speed gear 72, to cause the ends of the teeth on the sleeve 76 to abut with the teeth on the outside of the blocker ring at all times when the drive pinion and the mainshaft third speed gear are not rotating at the same speed. As to the synchronizer 80 the same is of conventional design and is accordingly not described in detail.

Describing now the double-acting fluid pressure operated motor 26 which actuates the synchro-mesh sleeve 78, Figure 2, this motor, which is disclosed in detail in Figure 9, comprises a casing 93 and a piston 94 the latter being connected by a rod 95 to a crank 96, Figure 8.

Figure 7:
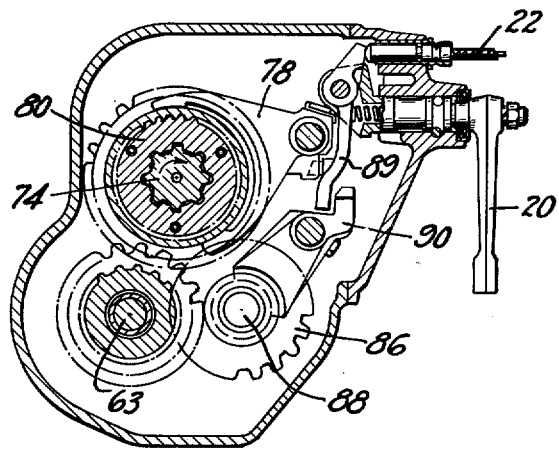
Figure 7 is a transverse sectional view taken through the synchronizer 80 of Figure 2 and looking rearwardly to disclose certain parts of the transmission.

As disclosed in the latter figure a forked end of the crank 96 is pivotally mounted upon a hollow shaft 97 which may be secured to a part of the chassis 98 of the car or a part fixedly secured thereto. The aforementioned pressure differential and spring operating motor 30, which includes a power element 100, is mounted upon the outer end of the shaft 97 said power element being connected at its center to a pin 101 slidable within said shaft. Pins 102, mounted in openings in one end of the pin 101, serve as key members to interconnect the pin 101 with the hub portion of a crank 103 said crank being connected, by a rod 104, with the aforementioned crank 20. The latter crank serves to actuate the sleeve 78 by the mechanism disclosed in Figure 7. The pins 102 are adapted to slide within slots 105 in a bushing 106 and slots 107 in the shaft 97 this construction making it possible to bodily move the crank 103 either to the right or left, Figure 8. As is disclosed in the latter figure the hub of the crank 103 is shaped to interlock either with the hub of a crank 108 pivotally mounted on the shaft 97 or with one of the ends of the crank 96 depending upon the operation of the motor 30. The latter motor is vacuum energized when the engine 12 is idling to make of the intake manifold 50 a source of vacuum, the control valve 32 being then opened by a spring 109 to interconnect said manifold with a compartment 110 of said motor. The power element 100 is then subjected to a differential of pressures moving the same to the right to interlock the cranks 96 and 103, said position of the parts being disclosed in Figure 8. In this operation air passes from compartment 110 to the intake manifold via a duct 111, the interior of a casing member 112 secured to the casing of the motor 30, a duct 113 in a fitting 114 mounted in the end of the casing 112 and the interconnected conduits 11, 15 and 17. A compartment 115 of the motor 30 is permanently vented to the atmosphere via a port 116 in the motor casing. It is to be noted here that a check valve 116', Figure 1, is included in the conduit 11 to insure a vacuum energization of the motor 30 and the consequent maintenance of the connection between the motor 26 and crank 20, when the car is brought to a stop and the engine is stopped. As will be brought out in the description to follow there is thus provided, with the mechanism of my invention, means for insuring a start of the vehicle in a relatively low gear setting when a selector lever 117' is left in its automatic position.

Now the valve 32 is moved to the left, Figure 8, when electrical current is passed through a winding 117 said winding, together with the valve 32 acting as an armature, constituting a solenoid which is indicated by the reference numeral 118. Passage of said current, that is the energization of the solenoid 118, serves to seat the valve 32 upon the end of the duct 113 and uncover a port 119 in the casing of the motor 30. The compartment 110 is thus vented to the atmosphere via port 116, compartment 115, port 119, the interior of the solenoid 118 and duct 111; and this operation results in a spring energization of the motor 30 that is a spring 120, which is compressed when said motor is vacuum energized, expands to move the hub of the crank 103 into mesh with the hub of the manually operated crank 108.

As is disclosed in Figure 1 the crank 108 is connected to the so-called shift lever or selector lever 117' by a rod 122, a lever 123, a rod 124 and a crank 125 mounted on the lower end of a tubular shaft 126. As will be understood from an inspection of Figures 1, 4, 12 and 13 when the shift lever 117' is lifted up, that is rotated counterclockwise in a plane perpendicular to the plane of the steering wheel 127 of the vehicle, then said lever fulcrums at 128, Figure 12, to bodily move the shaft 126 downwardly to effect a reverse gear operation of the Bowden control 22 and a closing operation of a switch mechanism 22'; and as will appear from an inspection of Figure 13 when the shift lever 117' is rotated in a plane substantially parallel to the plane of the steering wheel 127 then the shaft 126 is rotated about its longitudinal axis thereby rotating the crank 125; and this operation serves to effect any one of three settings of a selector switch 128' shown at the base of the steering column in Figure 1 and diagrammatically in Figure 3. These three settings, defined as automatic, neutral and overrule, will be discussed hereinafter when the operation of the entire shifter mechanism constituting my invention is described in detail.

The switch 128', shown in detail in Figure 16, is actuated by a crank 129 which in turn is rotated by means, not shown, actuated by a link 130, Figure 4. The crank 125 is biased, by a spring 131, to the position disclosed in Figure 4; and in this position one end of a pin 132, extending through one end of said crank, fits within an opening in the end of the link 130, all as is disclosed in Figure 4. It follows therefore that rotation of the selector lever 117' when in its normal position results in an operation of the switch 128' to control the power operation of the transmission operating crank 20 whereas when said selector lever is actuated to effect a reverse gear setting of the transmission this operation is effected solely by the physical effort of the driver. When the reverse gear setting of the transmission is being effected there is no operation of the switch 128' inasmuch as the pin 132 is then out of registry with the link 130.

Referring now again to the motor 26, energization of said motor serves to move the piston 94 and the sleeve 78 connected thereto to establish the synchronizer 80 in any one of a transmission neutral setting, the aforementioned low range setting or the aforementioned high range setting. When the synchronizer is established in its low range setting, the transmission is, as previously described, established in either first gear or second gear depending upon the setting of the synchro-clutch sleeve 76; and when the synchronizer 80 is established in its high range setting the transmission is established in either its third or fourth gear setting depending upon the setting of said synchro-clutch sleeve.

The motor 26 is controlled by the aforementioned valve mechanism 48 which, as disclosed in Figures 9, 10 and 11, is preferably detachably secured by bolts to the casing of said motor. The valve mechanism 48 includes a body member 133 which is recessed and bored, as disclosed in Figures 9, 10 and 11, to provide the hereinafter described ports and ducts. Valve operating solenoids 134 and 135 are preferably detachably mounted on the body member 133 the armatures 136 and 137 of said solenoids being biased downwardly by springs 138 and 139 respectively to vent the control chambers 140 and 141 of the motor to the atmosphere. The solenoids 134 and 135 may be defined respectively as the low range and high range solenoids. The motor 26 is disclosed in Kliesrath et al. Patent No. 2,156,118 dated April 25, 1939 accordingly no claim is made to said motor in this application.

Describing now the operation of the motor 26 which may be defined as the range shifter motor of applicant's invention, when the solenoid 134 is energized the armature 136 is moved upwardly against the tension of the return spring 138 thereby seating a valve 142 at 143 and uncovering a duct 144. This duct registers with a duct 145, Figure 11, connected to the aforementioned conduit 13 said conduit being connected to the intake manifold 50 of the internal combustion engine 12. The compartment 140 of the motor is thus connected with the intake manifold constituting a source of vacuum the degree of vacuum being fairly high when the throttle of the carburetor is closed to idle the engine. This operation results in a movement of the piston 94 to the left, Figures 3 and 9, to establish the synchronizer in its low range setting; for when the compartment 140 is partially evacuated by connecting the same with the intake manifold the other compartment 141 of the motor 26 is vented to the atmosphere via an air cleaner, not shown, a nipple 146, a duct 147 and a recess 148, Figures 9 and 11. The piston is therefore subjected to a differential of pressure to move the same to the left.

When the solenoid 135 is energized the armature 137 of said solenoid is moved upwardly against the tension of the spring 139 thereby seating a valve 149 at 150. The motor 26 is then again energized, the compartments 140 and 141 being connected by the above described air transmitting connections, with the atmosphere and manifold respectively. The piston 94 is then subjected to a differential of pressures moving the same to the right, Figures 3 and 9 to establish the synchronizer in its high range setting. The motor 26 may also be energized to move the piston 94 and the sleeve 78 connected thereto to neutralize the transmission, however, this operation is described hereinafter in conjunction with the description of the electrical means for controlling the operation of the solenoids 134 and 135.

Referring now to Figure 6 disclosing the kickdown motor unit 24 said unit actuates the synchro-clutch sleeve 76 and in part controls the operation of the ignition system. This motor unit, which is double acting by virtue of being spring operated in one direction and pressure differential operated in the other direction, includes a double ended casing 151 housing a piston or equivalent power element 152 which may be connected with the synchro-clutch sleeve operating crank 18 by a rod 153. The solenoid operated valve unit 46 for controlling the operation of the unit 24 is disclosed in detail in Figure 14. This valve unit comprises casing parts 154 and 155 housing a solenoid 156. To the lower end of the armature 157 of this solenoid there is connected a valve member 158 adapted, when the solenoid is energized, to seat at 159 to close off an opening 160 in a plate 161 clamped between the aforementioned two casing parts. This opening 160 serves to interconnect chambers 162 and 163 of the valve mechanism chamber 162, as disclosed in Figure 14, being vented to the atmosphere by means of a conduit 164 leading to an air cleaner. The chamber 163 is connected to the intake manifold by the conduit 17 and to a compartment 165 of the motor 24 by means of the conduit 19. A chamber 166 of the motor 24 is permanently vented to the atmosphere by means of an opening 167 in the motor casing.

As disclosed in Figure 6 the motor is provided with means for holding the piston 152 in its upshift position that is the position taken by the piston when the motor is energized by operating the valve 158 to connect the motor chamber 165 with the intake manifold as a source of vacuum. When this is done, that is when the valve operating solenoid 156 is energized to seat the valve member 158 at 159 and thereby place the motor compartment 165 in air transmitting communication with the intake manifold, the piston 152 is moved to the right, Figure 6 by the differential of pressure acting upon the same; and this operation serves to rotate the synchro-clutch operating crank 18 to connect the gear 72 with the drive pinion 58 all as previously described. This operation of the piston also serves to compress, that is, compress a kick-down spring 168 housed within the motor compartment 165. Now when this upshift operation of the piston is completed then said piston is in contact with a grounded electromagnet 169 Figure 6; and this electromagnet is at the time energized by virtue of its being wired in series, Figure 3, with the then energized valve operating solenoid 156. The piston is therefore held by the electromagnet 169 in its upshift position until the valve operating solenoid is deenergized to effect the downshift or kickdown operation of the motor 24.

When the solenoid 156 is so operated a spring 170 serves to move the valve operating armature 157 to thereby move the valve 158 into contact with a seat 172 thereby cutting off the connection between the intake manifold and the control chamber 163 and venting said chamber to the atmosphere via the opening 160, the control chamber 162 and the conduit 164. The piston 152 is then immediately moved to the left, Figure 24, by the expansion of the cocked spring 168 this operation, as described above, being made possible by the deenergization of the electromagnet 169; and this power operation of the piston by the spring 168 serves to move the synchro-clutch sleeve 76 to the right, Figure 2, to disconnect the drive pinion 58 from the mainshaft third speed gear 72. This operation, that is the spring operation of the motor 24 to declutch the pinion 58 and gear 72, is known in this art as a kickdown operation of the transmission.

The kickdown operation of the motor 24 is facilitated by a momentary disabling of the ignition system of the engine and to this end there is secured to one end of the motor casing 151 an ignition interrupter switch 173 said switch being grounded. This switch comprises a fixed contact 174 secured to a switch housing member 175; and the movable contact member 176 of the switch comprises a plate biased to the left, Figure 6, by a relatively weak spring 177. The switch 173 is closed by means of a spring 178, stronger than the spring 177, housed within a tube 179 fitted within the electromagnet 169. A hex shaped thrust member 180 is housed within the tube 179 between a locking ring 181 and the spring 178.

Now when the motor 24 is vacuum energized, that is when the piston 152 is moved to its upshift position in contact with the electromagnet 169, a pin 182 mounted on the end of the connecting rod 153 serves to compress the springs 178 and 177 to close the ignition interrupter switch 173. The spring 177, being weaker than the spring 178, is compressed before the latter spring is compressed accordingly when the motor is spring energized to effect a kickdown operation of the transmission the piston 152 moves a short distance as the spring 178 expands; and during this operation the spring 177 remains compressed the switch 173 remaining closed. When the spring 178 has completed or substantially completed its expansion then the spring 177 expands to open the switch 173.

There is thus provided motor operated means for maintaining the ignition interrupter switch closed for a very brief period of time and, as will be brought out in greater detail hereinafter, the ignition system is during this brief period of time disabled to thereby reverse the engine torque to facilitate the kickdown operation of the transmission.

Describing now the complete operation of the mechanism constituting my invention and incidentally describing details of electrical mechanism not heretofore described, it will be assumed that the driver has rotated the shift lever 117' clockwise to set the selector switch mechanism 128' in its automatic position indicated by the letter A in Figure 3. It will also be assumed that switches 181' and 182' of the shift lever operated switch mechanism 22' are open and that the accelerator 42 is released to close a switch 183' and to idle the engine 12 thereby making of the intake manifold 50 a source of vacuum to make possible a vacuum energization of the motors 24, 26 and 30. It is further assumed that the car is at a standstill thereby effecting an operation of a vehicle speed responsive governor 184, Figure 3, to move a contact 185 into engagement with a contact 186.

Now with the above described setting of the controls the parts of the mechanism take the position disclosed in Figure 3, that is, the piston 152 of the motor 24 is in its kickdown setting indicated by the letters KD in Figure 1, the piston 94 of the motor 26 is in its low range setting indicated by the letter L in Figure 3 and the piston 100 of the motor 30 is in the position disclosed in Figure 8 to mesh the crank 103 with the yoke portion of the crank 96. The transmission is accordingly then established in its first gear setting.

Describing the operation of the mechanism to effect this setting of the transmission, when the selector lever is moved to establish the selector switch mechanism 128' in its automatic that is A position, then the grounded solenoid 134 of the motor 26 is electrically connected to a battery 187 by wires 8 and 9, the armature 10' of a relay 11', wires 21 and 3, a fixed contact S, Figure 16, of the selector switch 128', a movable contact C of said switch, wires 2' and 2, the then closed accelerator operated breaker switch 183', wires 23 and 12', the ignition switch 188 of the car and a wire 13'. The solenoid 134 is thus energized thereby, as previously described, effecting the low range setting of the motor 26 to effect a low range setting of the sleeve 78. Referring to Figures 4 and 8 when the selector lever 117' is in any one of its neutral, overrule or automatic positions the switches 181' and 182' of the switch mechanism 22', Figure 3, are open and the operation of opening the switch 182' results in a deenergization of the solenoid 118 to effect, by the opened valve 32, a vacuum operation of the motor 30. As previously described the cranks 96 and 103 are by this operation interlocked making possible the above described power operation of the crank 20 by the motor 26. As to the control of the motor 24 to effect its kickdown setting the winding 190 of a relay 191 is electrically connected to the battery 187 by wires 25 and 27, the wire 12', the ignition switch 188 and the wire 13'; and said winding is electrically connected to the ground by a wire 29, a wire 31, a movable contact F, Figure 15, mounted on a movable contact support 41, a fixed contact H, a wire 33, a wire 35, a fixed contact M of the switch 128', a movable contact E of the latter switch and a grounded wire 6. The switch mechanism disclosed in detail in Figure 15 may be defined as an interlock switch and is indicated as a whole by the reference numeral 192 said switch being actuated by an operation of the crank 20. It is to be noted at this juncture that with the car at a standstill the transmission is probably in its neutral setting accordingly, to energize the winding 190 in the operation of effecting the first gear setting of the transmission it is necessary that the electrical circuit from the ground to said winding be completed through the switch 192 when said switch is in its transmission neutral setting; and it is this circuit that has just been described. Now when the winding 190 of the relay 191 is energized, there results a movement of the armature of said relay to open a switch 193, Figure 3; and this operation results in a deenergization of the solenoid 156 to thereby effect the above described kickdown operation of the motor 24.

The transmission is therefore established in its first gear setting when the engine is idling, the accelerator is released and the selector switch 128' is established in its automatic position. Incidentally, with the transmission established in first gear the relay 191 remains energized to maintain the motor 24 in its kickdown setting; for when the synchronizer operating crank 20 is in its low range position the current from the winding 190 to the selector switch 128' is effected by wires 29 and 31, movable contact F of the switch 192, Figure 15, a fixed contact I of said switch, a wire 37 and wires 33 and 35.

Briefly completing the description of the selector switch 128' disclosed in detail in Figure 16 this switch mechanism is mounted within a casing 194 which houses a fixed support member 195 and a movable support member 196 slidable within bearings 197 and 198. The movable contact support member is connected with the crank 129 by means of a rod 199; and the three positions of the selector switch, that is, the automatic, neutral and overrule positions, are indicated by the letters A, N and O in Figure 16. It is to be particularly noted at this juncture that the several contacts of the selector switch 128' are so constructed and arranged that when said switch is in its overrule position, that is position O, the only contacts in engagement with each other are the contacts C and O. When this switch is in in its automatic position A the only contacts in engagement with each other are contacts C with S, D with T and E with U; when the switch is in its transmission neutral position N the only contacts in engagement with each other are B with N and E with M.

Briefly completing the description of the transmission operated interlock switch 192, Figure 15, the same comprises a fixed support member 200 upon which are mounted the fixed contacts H, I and J and the aforementioned movable support member 41 upon which are fixedly mounted the movable contacts F and G. The support member 41 is connected to the transmission operating crank 20 by a rod 201 and the three operative positions of said cranks are indicated by the words High, Low and Neutral in Figures 3 and 15. Referring to Figure 3, the interlock switch is closed that is made in the positions indicated in said figure.

Continuing now with the description of the operation of the mechanism constituting my invention it is to be remembered that the transmission is established in its first gear setting when the car is at a standstill, the accelerator is released to, among other things, idle the engine and the shift lever is in its automatic position. There is no need to disengage the friction clutch at this time inasmuch as the presence of the fluid coupling in the power plant makes this operation unnecessary. The driver then depresses the accelerator to open the throttle thereby speeding up the engine to get the car under way. Now as the car is moved forwardly the transmission 10 remains in its first gear setting until the speed of the car exceeds the governor speed of say 14 M. P. H.; and this governor speed depends of course upon the setting of the governor 184. At governor speed the movable contact 185 of the governor moves into contact with a fixed contact 202 of said governor; and when this occurs and the accelerator is released to reverse the engine torque, the transmission is automatically established in its third gear setting it being noted that the motor 24, by virtue of the operation of the switch 192, remains spring energized to maintain the sleeve 76 in its kickdown setting.

Explaining this operation of the mechanism the relay 11' is energized; and when the armature 10' of said relay moves downwardly an electrical circuit is completed to energize the solenoid 135 of the motor 26. This operation, as previously described, results in a high range operation of said motor. Tracing the electrical circuit to effect an energization of the relay 11' when contacts 185 and 202 of the governor are brought into engagement with each other the grounded battery 187 is connected to the grounded movable contact 185 via wire 13', ignition switch 188, wires 12' and 23, accelerator switch 183', wires 2 and 2', contacts C and S of the selector switch 128', wires 3 and 21, the winding 43 of relay 11', wires 45, 47 and 49, contacts T and D of said switch and wire 51. As to the electrical circuit interconnecting the grounded solenoid 135 with the battery 187 this circuit includes wires 39 and 55, the armature 10' of the relay 11', a wire 57, a wire 59, the wires 27 and 12', the ignition switch 188 and the wire 13'.

Now very shortly after the transmission has been established in its third gear setting it is operated to be established in its fourth gear setting; for it is to be noted that by virtue of the construction of the interlock switch 192 and the synchro-clutch mechanism 77 of Figure 3, the upshift operation of the motor 24 is not effected until after the motor 26 has completed its operation of establishing the transmission in its third gear setting. In explanation and referring to Figure 15 it will be noted that by virtue of a relatively long conductor plate 204 electrically interconnecting the contacts H and I that the circuit maintaining the kickdown relay 191 energized is kept closed until the establishment of the transmission in its third gear setting is just about completed. When the latter setting is completed the contacts F and H are separated and contacts G and J are in engagement with each other; however, it is to be noted that the electrical connection from contact J to ground is at this time broken. Now when the relay 191 is deenergized then the motor 24 is immediately vacuum energized to effect the upshift operation of the transmission to establish the same in its fourth gear setting. As noted above the operation of the synchro-clutch mechanism 77 also plays a part in delaying the operation of establishing the transmission in its fourth gear setting until after the third gear setting has been completed or substantially completed; for in the operation of the mechanism 77 a certain time is required to effect the synchronization of the gears to be meshed.

As referred to above this successive establishment of the transmission in its third and fourth gear settings is also facilitated by the time required for the synchro-clutch 77 to operate to effect the fourth speed setting of the transmission; and it is to be particularly noted that both of these operations are facilitated by the operation of the free wheeling mechanism 64 constituting a part of the transmission. For when the transmission is established in either its first or third gear setting this free wheeling mechanism, upon release of the accelerator, effects a reversal of the torque, that is, a so-called unloading of torque upon the gears. It follows therefore that when the accelerator is released to render the free wheeling mechanism 64 operative then the gear demeshing and remeshing operations of the motors 24 and 26, particularly the demeshing operation, are easily effected.

The transmission having been established in its fourth gear or so-called direct drive setting, the driver will then again depress the accelerator to increase or at least maintain the existing vehicle speed.

Should the driver then wish to quickly pass a car on the road he may do so by merely fully depressing the accelerator to close switches 61 and 65 of a switch mechanism 67, Figure 3. This automatic operation automatically effects the aforementioned kickdown operation of the motor 24 to establish the transmission in its third gear setting, the ignition system being momentarily disabled to facilitate this operation. Describing this operation of the transmission mechanism when the accelerator is fully depressed the throttle valve is first fully opened and then, by virtue of the compression of a spring 31', Figure 1, the continued movement of the accelerator operated rod 39 serves to close the switches 61 and 65 of the switch mechanism 67. The spring 31', which is stronger than a throttle return spring 33', is sleeved over the end portion of the rod 39 and is positioned between a stop 35' pinned to said rod and one end of a hollow pin 37' which slidably receives the end of said rod. The throttle operating crank 36 is pivotally secured to one end of the pin 37'. It follows therefore that when the accelerator is fully depressed the throttle valve 34 will be fully opened its movement stopping when it contacts a stop 43'; and continued depression of the accelerator will serve to compress the spring 31' to make possible sufficient movement of the rod 39 to close the switches of the switch mechanism 67. Upon release of the accelerator the spring 31' will expand until the stop 35' contacts one end of a plate 45' hooked over the end of the pin 37' at its other end.

Now the closing of the two switches 61 and 65 results in a kickdown operation of the motor 24; for the closing of the switch 65 completes an electrical circuit to ground the primary winding of the coil 69 of the ignition system and the closing of the switch 61 serves to complete an electrical circuit to effect an energization of the kickdown relay 191. Describing the first of these two circuits the aforementioned ignition interrupter switch 173, disclosed in detail in Figure 6 and diagrammatically in Figure 3, is connected to the primary winding of the coil 69 by means of a wire 22', the switch 65, and wires 71 and 73. As to the second of these two circuits the winding 190 of the relay 191 is connected to ground by means of the wire 29, a wire 81 and the grounded switch 61.

The energization of the relay 191 serves of course to open the switch 193 thereby effecting a spring energization of kickdown operation of the motor 24; and as previously described during this operation of the motor the ignition interrupter switch 173 is momentarily closed. It follows therefore that since the above described ignition coil grounding circuit is at the time momentarily closed that the ignition system will be momentarily disabled to facilitate the operation of the transmission in changing its setting from fourth to third gear.

The driver will then, after passing the other car on the road, release the accelerator to a normal setting to thereby maintain the desired car speed. Now in effecting this release of the accelerator if he closes the throttle sufficiently to develop an appreciable vacuum in the intake manifold and opens the switches 61 and 65, then the motor 24 is again vacuum energized to return the transmission to its fourth gear setting. This operation, as explained above, is facilitated by the torque reversal operation of the free wheeling means of the transmission.

Describing now the other downshift operation of the transmission, when the selector switch 128' is established in its automatic setting should the speed of the vehicle be reduced below governor speed, that is, sufficiently to effect a movement of the grounded movable contact 185 into engagement with the fixed contact 186, Figure 3, then the kickdown motor 24 will be automatically spring operated to effect the change of setting of the transmission from fourth to third gear; for when the contacts 185 and 186 are in engagement an electrical circuit, via a wire 85, contacts J and G of the interlock switch 192, a wire 87 and the wire 29, is completed between the relay winding 190 and the ground. The energization of the relay 191 therefore ensues and this operation, as previously described, effects a downshift operation of the motor 24 to effect the third gear setting of the transmission. It is to be noted that with this operation of the motor 24 there is no interruption of the ignition system said operation being unnecessary in view of the relatively low vehicle speed at the time; furthermore, the driver in all probability has at this time substantially reduced the engine torque by releasing the accelerator thereby facilitating this governor operated downshift operation.

At this juncture it is to be particularly noted that with the mechanism of my invention once the transmission is established in its high range setting it remains in this setting until either the hereinafter described overrule operation is effected or until the clutch pedal 206 of the car is depressed sufficiently to open a breaker switch 207, Figures 1 and 3. This high range setting of the transmission is maintained, so long as this clutch pedal operated switch remains closed and despite the operation of the governor 184 below governor speed, by virtue of the so-called hold down operation of the relay 11', Figure 3; for once this relay is energized to move the armature 10' downwardly, Figure 3, then said relay remains energized by virtue of the grounding of the relay winding 43 via the grounded clutch operated switch 207. Tracing this circuit the grounded switch 207, which is then closed, is electrically connected to the grounded battery 187 via a wire 89, a contact 91 of the relay mechanism, one end of the armature 10', the wire 45, the relay winding 43, a wire 93, the other end of the armature, wires 57, 59, 27 and 12', the ignition switch 188 and the wire 13'. With the relay 11' energized it follows that the solenoid 135 of the motor 26 is energized to establish the transmission in its high range setting. The electrical circuit between the latter solenoid and the grounded battery was described above, accordingly, the tracing of this circuit will not be repeated here.

It is apparent therefore that once the high range setting of the transmission has been established said transmission will shuttle back and forth between its fourth and third gear settings under the control of the governor operated switch mechanism and the accelerator the latter controlling the engine torque and the operation of the free wheeling unit 64.

Should the driver wish to shift the transmission down from its fourth to its second gear setting or from its third to its first gear setting he may effect either operation by releasing the accelerator to close the switch 183' and depressing the clutch pedal 206 sufficiently to open the switch 207. This operation of course effects a deenergization of the relay 11' the armature 10' being moved by a spring 208, to complete an electrical circuit to effect an energization of the low range solenoid 134 of the motor 26. The latter motor is then energized to effect the low range setting of the transmission.

The driver may, when the transmission is in either fourth or third gear depending of course upon the vehicle speed, effect what is defined as an overrule operation of the transmission operating mechanism. The selector lever 117' is moved to its overrule position, that is, the position O in Figures 3 and 16 and the accelerator is released to effect the necessary torque reversal and closure of the switch 183'. The transmission is then established in its low range setting by an operation of the motor 26. If this overrule operation is initiated when the transmission is established in its fourth gear setting then the shift is from fourth gear to second gear; and if the overrule operation is initiated when the transmission is established in its third gear setting then the shift is from third gear to first gear. As to the operation of the electrical control to effect this overrule operation it is to be remembered, as described above, that when the selector switch 128' is in its overrule position O all three of the automatic, that is A, Figure 3, selections of the contacts of said switch are disabled. It follows therefore that when the overrule selection of said switch is made that the relay 11' is deenergized thus completing the circuit, through the relay and selector switch, to effect an energization of the low range solenoid 134; and this operation, as described above, results in an operation of the motor 26 to establish the transmission in its low range setting.

The transmission 10 may be neutralized by the power means by merely releasing the accelerator to close the switch 183' and then placing the selector switch in its neutral, that is, N setting, Figure 3. The motor 26 is then energized to bring the piston 94 to its central position, Figure 9, thereby effecting a neutralization of the transmission. Referring to Figures 3 and 9 it will be noted that there is provided what is defined as a neutral switch mechanism 210 comprising a fixed contact 71' and two movable spring contacts 73' and 75'. The latter contacts are biased, preferably by their own preformed shape, into engagement with the fixed contact and forced away from the latter contact by a lever 212 an end portion 79' of said lever being positioned between ends of the contacts 73' and 75' and an end portion 81' of said lever being in contact with the piston 94. The contact 73' is connected to the wires 39 and 55 by a wire 9' and the contact 75' is connected to the wires 8 and 9 by a wire 8'. As disclosed in Figure 3, the wire 1 is connected to the fixed contact 71'.

Describing the transmission neutral operation of the motor 26 if the transmission is established in its high range setting then the lever 212 fulcrums at 213 to effect a separation of the contacts 71' and 73' and to permit the engagement of the contacts 71' and 75'; and if the transmission is established in its low range setting then said lever is biased, by a spring 214, to a position to permit the engagement of the contacts 71' and 73' and to effect a separation of the contacts 71' and 75'. It is apparent therefore that when the transmission is established in either one of the range settings the neutral switch mechanism is preselected to effect an operation of the motor 26 to establish the other range setting of said transmission. To neutralize the transmission then the driver needs but to release the accelerator to close the switch 183' and place the selector lever 117' in its transmission neutral position whereupon the switch 128' is established in its N position, Figures 3 and 16. The motor 26 is then energized to neutralize the transmission, that is, move the sleeve 78, Figure 2, to its neutral position; and in this operation the movement of the piston 94 is arrested when it reaches said position, all as is disclosed in Figure 9. This arresting operation is effected by virtue of the fact that both contacts 73' and 75' are spaced from the fixed contact 71' when the piston 94 is in its transmission neutral position.

It is to be noted, from an inspection of the switches 128' and 192 in Figures 3, 15 and 16, that the kickdown motor 24 is operative to effect the kickdown operation of the transmission and maintain this setting whenever the transmission is neutralized as described above; and it is also to be noted that in the operation of establishing the transmission in its reverse gear setting from one of the two range settings that the transmission is neutralized by the power means prior to the manual operation of establishing the transmission in reverse.

There is thus provided a relatively simple manually and power operated transmission operating mechanism, controlled by the operation of three manually operated controls in their actuation of the switches 167, 183; 128, and 207; the operation of the motor 26 in its actuation of the switch 192; and the operation of the governor 184 in its actuation of the switch mechanism 185, 186, 202. Three separate power means are included in this four-speeds forward and reverse transmission operating mechanism. One of said power means comprises the motor 30 and is defined in the attached claim as a selector power means; another of said power means comprises the motor 26 and is defined in the claim as a first transmission operating power means; and the third of said power means comprises the motor 24 and is defined in the claim as a second transmission operating power means. With the shift lever positioned in its so-called automatic setting A, which is one of the four settings of said lever, the transmission is automatically shifted from first gear to third gear and then to fourth gear in getting the car under way; and so far as the aforementioned controls are concerned this operation is effected merely by a release of the accelerator after the car has reached a certain speed. The transmission then remains established in its fourth gear setting until the driver desires to shift to third gear, this operation being effected by either fully depressing the accelerator or by slowing the car down below a certain speed; or the driver may at any time, by merely releasing the accelerator and placing the shift lever in its overrule that is O setting, shift the transmission either from fourth gear to second gear or from third gear to first gear. Then too, the driver may, with the shifter mechanism of my invention, neutralize the transmission from any setting by releasing the accelerator and then placing the shift lever in its neutral setting; and the driver may, by a combined manual and power operation of the transmission, place the transmission in its reverse gear setting by moving the shift lever to its reverse gear setting; and the driver may shift the transmission from third to first gear or from fourth to second gear by merely releasing the accelerator to close the switch 183' and depressing the clutch pedal sufficiently to open a switch 207. It is to be remembered that the unidirectional drive through the transmission, by virtue of the overrunning clutch 64, facilitates the shift of the transmission from its first gear setting and from its third gear setting.

Most operations of the shifter mechanism of my invention are, however, substantially automatic in action, that is the shifting of the transmission from fourth to third gear or from third gear to fourth gear. In this automatic operation the accelerator is the only control actuated by the driver.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the forms hereinbefore described being merely preferred embodiment or alternative thereof.

I claim:

In a drive for an automotive vehicle provided with a steering wheel and a four-speeds forward and reverse transmission which includes a selector member and a transmission operating member, means for operating said transmission comprising a bodily movable member, force transmitting means interconnecting said bodily movable member with the transmission operating member, a manually operable selector lever mounted adjacent the steering wheel, a crank adapted to be interlocked with the bodily movable member, force transmitting means interconnecting the selector lever with said crank, power means for operating said bodily movable member, and other power means, controlled in part by an operation of the selector lever, for moving the bodily movable member into or out of engageent with the aforementioned crank.

HAROLD W. PRICE.

REFERENCES CITED

The following references are of record in the file of this patent:

UNITED STATES PATENTS

| Number | Name | Date |
|---|---|---|
| 2,110,994 | Linsley | Mar. 15, 1938 |
| 2,242,542 | Peterson et al. | May 20, 1941 |
| 2,252,009 | Kenny | Aug. 12, 1941 |
| 2,267,464 | Iavelli | Dec. 23, 1941 |
| 2,291,189 | Matulaitis | July 28, 1942 |
| 2,297,026 | Sanford et al. | Sept. 29, 1942 |
| 2,309,468 | Matulaitis | Jan. 26, 1943 |
| 2,333,668 | Neracher et al. | Nov. 9, 1943 |
| 2,348,435 | Hey et al. | May 9, 1944 |
| 2,348,763 | Syrovy et al. | May 16, 1944 |
| 2,349,297 | Neracher et al. | May 23, 1944 |